J. G. STEFFEE.
AUXILIARY WATER CLOSET SEAT.
APPLICATION FILED FEB. 16, 1909.
948,798.
Patented Feb. 8, 1910.
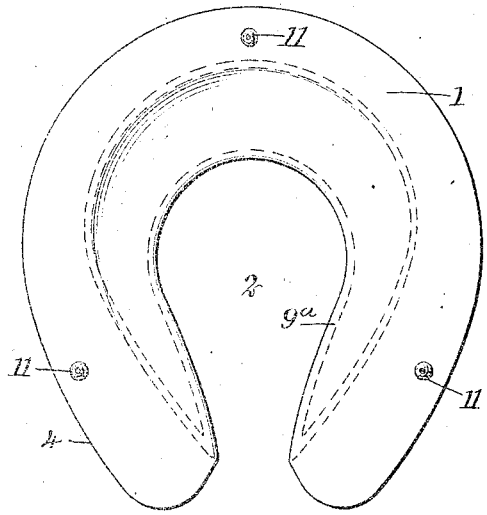
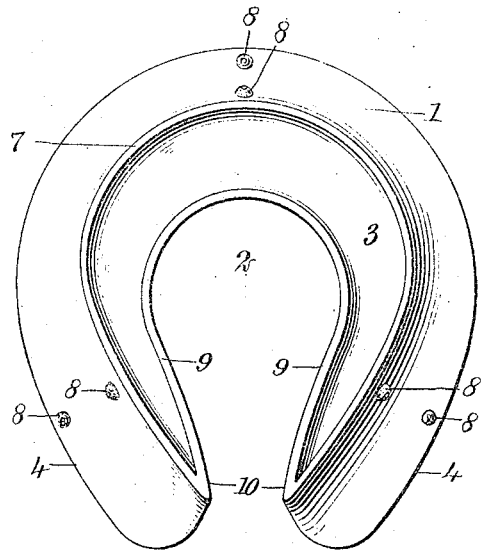
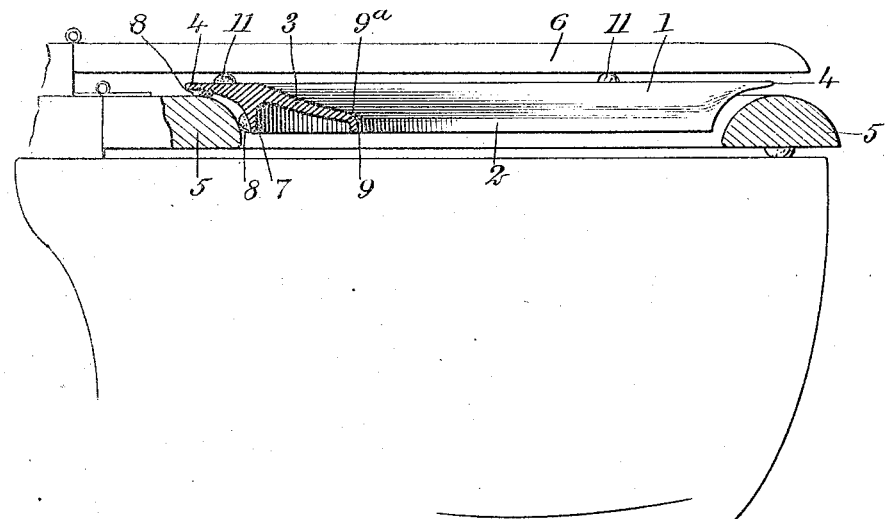
WITNESSES
INVENTOR
John G. Steffee
BY Munn & Co.
ATTORNEYS

UNITED STATES PATENT OFFICE.

JOHN G. STEFFEE, OF NEW YORK, N. Y.

AUXILIARY WATER-CLOSET SEAT.

948,798.　　Specification of Letters Patent.　　Patented Feb. 8, 1910.

Application filed February 16, 1909. Serial No. 478,155.

*To all whom it may concern:*

Be it known that I, JOHN G. STEFFEE, a citizen of the United States, and a resident of the city of New York, borough of Brooklyn, in the county of Kings and State of New York, have invented a new and Improved Auxiliary Water-Closet Seat, of which the following is a full, clear, and exact description.

The object of my invention is to provide a simple, auxiliary water-closet seat for the use of small children in connection with the regular seat of a water-closet, privy, hospital commode, chamber or other night-soil receptacle, my auxiliary seat being so designed that it affords the maximum comfort and convenience and so that it can be placed upon the regular seat board used by adults, and maintained firmly in its proper position without fastening it in any way.

My auxiliary water-closet seat is of such design and construction that it can be stamped, molded or pressed in a single piece, if need be, so that the necessity of assembling several parts is obviated.

The novel features of my invention are to be found in the provision and peculiar disposition of certain ribs, flanges and offsets, whereby I am enabled to produce a portable auxiliary seat which is not only very light and strong, but which is also applicable to any seat board employed by adults.

Reference is to be had to the accompanying drawings forming a part of this specification, in which similar characters of reference indicate corresponding parts in all the views.

Figure 1 is a top plan view of my improved auxiliary water-closet seat; Fig. 2 is a bottom plan view of my improved auxiliary water closet seat; and Fig. 3 is a partial longitudinal section showing my auxiliary seat in position on a regular water-closet seat, provided with the usual hinged cover.

My auxiliary water-closet seat has as one of its distinguishing features, an outer rim 4, which, it will be observed from Fig. 3 in particular, is of varying thickness, being thinnest at its outermost edge and increasing in thickness inwardly. The rim is thus made of decreasing thickness in an outward direction, in order that the cover 6 of the closet may lie flat upon the auxiliary water-closet seat, if it is desired to leave the auxiliary seat in place. The outer rim 4 merges into an inwardly and downwardly-extending seat portion 3 which is suitably curved and shaped to constitute a comfortable seat. The extreme edge of the flange 3 is turned downwardly to form an offset 9, which defines the central opening 2 of the auxiliary water-closet seat. In order that a sharp edge may not be presented, the junction of the offset and the seat portion is rounded as at $9^a$. The offset 9, furthermore, strengthens and stiffens the auxiliary water-closet seat, so that it can be made of very light construction. The under surface of the outer rim 4 of the auxiliary seat also merges into a downwardly-curved rib 7, so that a concave surface is formed which corresponds in general shape to the convex wall of the central opening of the regular seat board 5.

Knobs or buttons 8 are arranged in pairs at suitable points along the under surface of the outer rim 4 and the rib 7 for the purpose of preventing the auxiliary seat from coming into direct contact with the regular seat board 5, so as to avoid contamination, and for the additional purpose of providing bearing points which will prevent the auxiliary seat from slipping, particularly if the child should slide off the seat. For similar sanitary reasons I also provide the upper surface of the auxiliary seat with knobs or buttons 11, which will prevent the cover 6 from directly touching the auxiliary seat.

By reference to Fig. 2, it will be seen that the curved rib 7 and the curved offset 9 join each other at the front of the auxiliary seat so as to form two lips 10 which are sufficiently near each other to fall within a sharply oval or pear shaped central opening of a regular seat board and yet far enough apart to permit clear communication with the bowl. The rib 7 and the offset 9 are in practice preferably formed by cutting away or stamping out sufficient material from the blank. The character of the material selected or the particular manufacturing process employed may render it necessary to cut away or stamp out more or less of the material, so that there may not be a continuous open space between the offset 9 and the rib 7. Furthermore, it may be deemed expedient to remove sections of the rib 7 itself in the interest of lightness, for which reason the rib 7 need not necessarily be continuous so long as it provides a sufficient number of portions to bear against the regular seat. It is evident that the greater the amount of material that can be removed, the lighter will be the finished seat.

The manner of using my auxiliary seat is obvious. It is merely necessary to place it upon the regular seat board, without in any way attaching it. The outer rim 4 coacts with the rib 7 to distribute the strain downwardly and laterally against the regular seat board, thereby providing two supporting or sustaining areas for the auxiliary seat. The rib 7 acts as a wedging member, rigidly holding the auxiliary seat against the wall of the opening of the regular seat board. If the child should slip forward from the seat, the bearing knobs 8 will prevent the displacement of the auxiliary seat and possible injury to the child.

It is possible that on some seat boards having central openings of unusually large size, the rib 7 may fall so far within the central opening of the regular seat board 5 that it will be unable to exert its normal wedging effect. Hence only the outer rim 4 rests on the regular seat board 5, in which case the rib 7 serves to supplement the stiffening and strengthening effect normally exerted by the offset 9, thereby providing even in this extreme case a perfectly safe and rigid support for the child. Furthermore, the offset 9 and the rib 7 serve to preserve the shape of the auxiliary board and to prevent buckling.

My improved auxiliary seat can be cut or pressed out of any suitable material. It is portable and light, and is not in any way attached by fastening devices to a water-closet.

Having thus described my invention, I claim as new and desire to secure by Letters Patent:

1. As an article of manufacture, an auxiliary water closet seat having a downwardly projecting rib conforming approximately with the opening of the regular water closet seat, an outer bearing rim, and an inner seat portion, said outer bearing rim and inner seat portion projecting from opposite sides of the rib.

2. As an article of manufacture, an auxiliary water closet seat for use in connection with a regular water closet seat, said auxiliary seat being provided with dual bearing points, whereby the strain exerted by the weight of an occupant of the auxiliary seat on the regular seat is distributed on the regular seat board in two directions, approximately at right angles to each other, said auxiliary seat having an inwardly projecting portion forming a resting surface or seat proper and defining the central opening therein.

3. As an article of manufacture, an auxiliary water closet seat for use in connection with a regular water closet seat, said auxiliary seat having an open front portion comprising an outer rim of varying thickness, adapted to rest on the regular water closet seat; a seat portion sloping inwardly and downwardly from the rim; an offset projecting downwardly from the seat portion and serving to define the central opening of the auxiliary seat; and a rib depending from the seat portion and curving into the rim to conform with the general contour of the central opening of the regular water closet seat.

4. An auxiliary water closet seat for use in connection with a regular water closet seat, said auxiliary water closet seat having a downwardly projecting rib and a downwardly projecting offset, and spaced lips formed by the rib and the offset.

5. A child's auxiliary seat adapted to be imposed on the regular seat of a water closet, said auxiliary seat having an open front and comprising an outer sustaining rim; an inwardly and downwardly extending seat portion; and a depending rib located intermediate the inner and outer edges of the said auxiliary seat, the front ends of the said rib converging to terminate at the inner edge of the auxiliary seat, at the open front end of the said auxiliary seat.

6. A child's auxiliary seat adapted to be imposed on the regular seat of a water closet, said auxiliary seat having an open front and comprising an outer sustaining rim; an inwardly and downwardly extending seat portion; and a depending rib located intermediate the inner and outer edges of the said auxiliary seat, said rib following the general contour of the seat.

In testimony whereof I have signed my name to this specification in the presence of two subscribing witnesses.

JOHN G. STEFFEE.

Witnesses:
WALDEMAR KAEMPFFERT,
JOHN P. DAVIS.